United States Patent [19]

Bailey et al.

[11] 4,009,693
[45] * Mar. 1, 1977

[54] AIR PURGING AND COOLING SYSTEM FOR INTERNAL COMBUSTION ENGINES

[75] Inventors: John M. Bailey, Dunlap; John J. Cychul, Jr.; Michael K. Stratton, both of Peoria, all of Ill.

[73] Assignee: Caterpillar Tractor Co., Peoria, Ill.

[ * ] Notice: The portion of the term of this patent subsequent to June 1, 1992, has been disclaimed.

[22] Filed: May 19, 1972

[21] Appl. No.: 254,851

[52] U.S. Cl. .................. 123/41.82 A; 123/41.54; 123/41.73; 123/41.82 R
[51] Int. Cl.² .......................................... F02F 1/36
[58] Field of Search ......... 123/41.54, 41.73, 41.79, 123/41.82, 41.82 A, 193 H

[56] References Cited

UNITED STATES PATENTS

| 1,630,068 | 5/1927 | Muir | 123/41.54 X |
| 1,915,104 | 6/1933 | Ruehc | 123/41.82 A X |
| 2,739,579 | 3/1956 | Ware et al. | 123/41.82 A X |
| 2,976,859 | 3/1961 | Bentz | 123/41.54 |
| 3,074,389 | 1/1963 | Lilly | 123/41.82 X |
| 3,646,919 | 3/1972 | Reisacher | 123/41.54 X |

FOREIGN PATENTS OR APPLICATIONS

| 307,786 | 10/1919 | Germany | 123/41.73 |
| 828,014 | 2/1960 | United Kingdom | 123/41.82 |
| 258,393 | 9/1926 | United Kingdom | 123/41.73 |
| 766,187 | 1/1957 | United Kingdom | 123/41.82 |

*Primary Examiner*—Charles J. Myhre
*Assistant Examiner*—Daniel J. O'Connor
*Attorney, Agent, or Firm*—Phillips, Moore, Weissenberger, Lempio & Majestic

[57] ABSTRACT

The block of an internal combustion engine has a cylinder cooling jacket which communicates a circulating coolant to a head jacket. An overflow passage, terminating at an inlet positioned in close proximity to an upper wall of the head delays communication of coolant to an outlet manifold until the coolant exceeds a predetermined level in the head jacket to insure the prior purging of air and vapor therefrom.

11 Claims, 3 Drawing Figures

U.S. Patent      Mar. 1, 1977      4,009,693
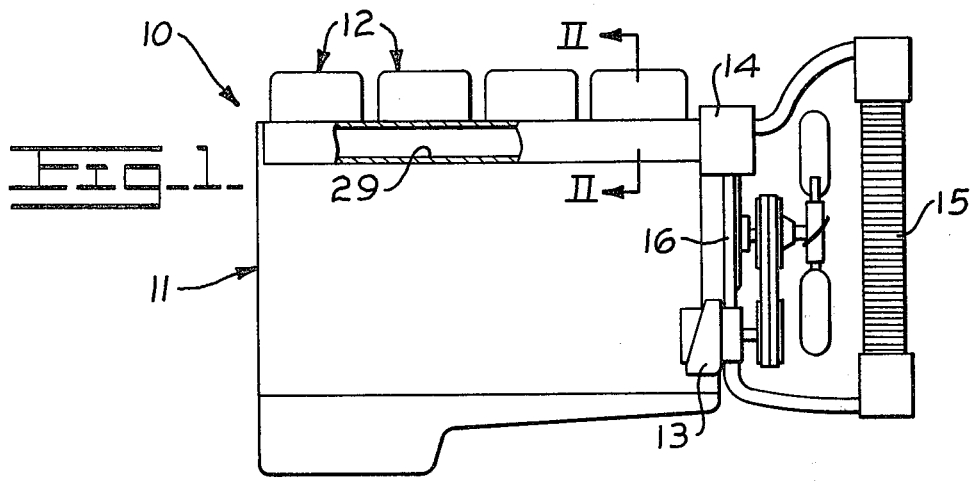
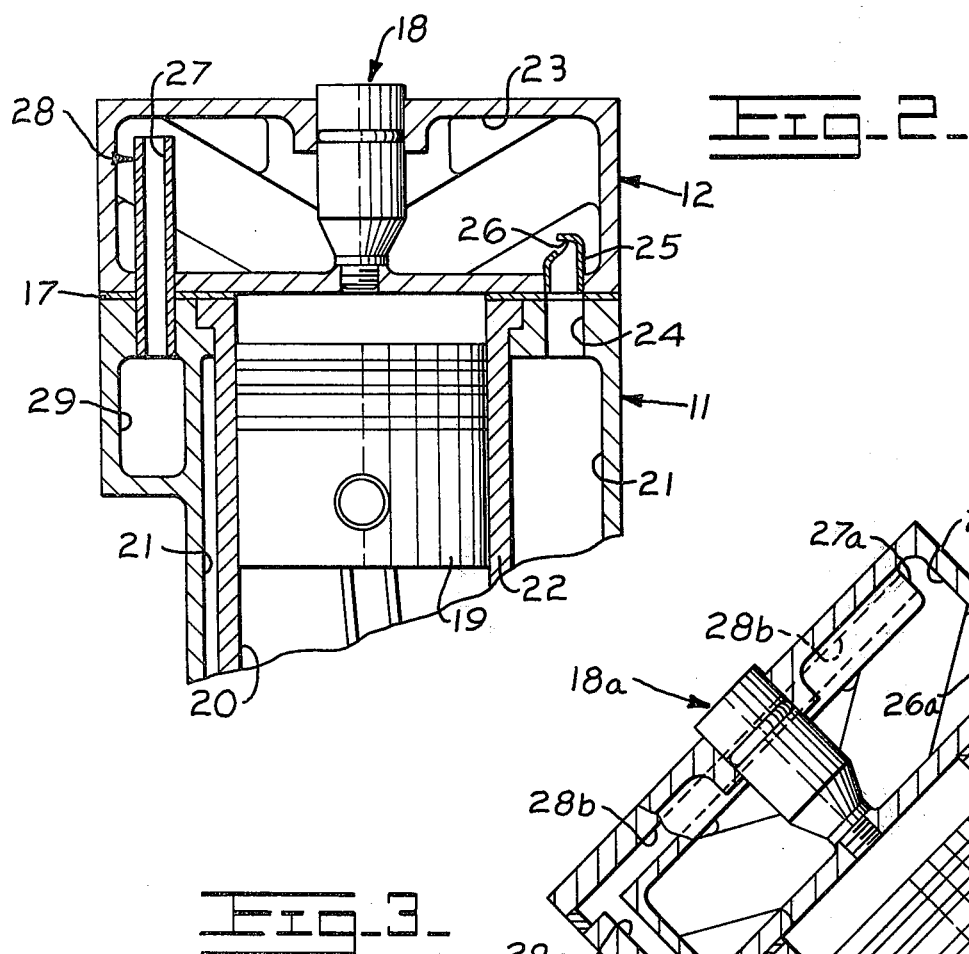
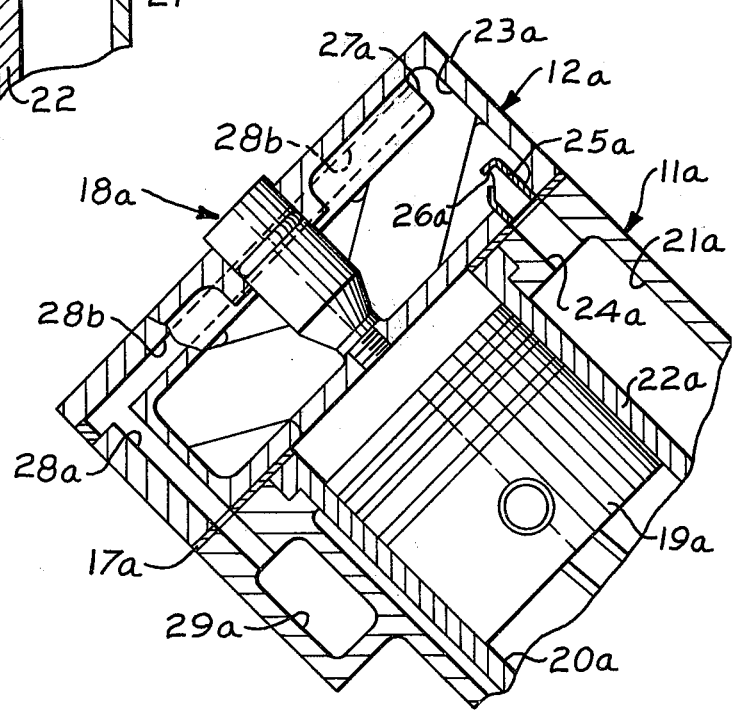

AIR PURGING AND COOLING SYSTEM FOR INTERNAL COMBUSTION ENGINES

BACKGROUND OF THE INVENTION

This invention relates to a cooling system for an internal combustion engine of the type wherein a coolant, such as water, is continuously circulated through cooling jackets formed in the block and head thereof and in particular to those engines which utilize an individual head for each cylinder or each pair of cylinders.

Conventional cooling systems of the latter type normally trap an appreciable amount of air and vapor in the cooling jackets thereof which adversely affects engine operation. In addition, many such systems give rise to sealing problems due to the utilization of a water manifold which connects with the water outlet of each individual head necessitating use of numerous sealing gaskets required for mounting the manifolds. These systems also increase repair and maintenance time because of the need of disengaging the water manifold from the head or heads when service or repair of the head structure is needed.

SUMMARY OF THE INVENTION

An object of this invention is to overcome the above, briefly described problems by providing an economical and efficient cooling system for internal combustion engines which alleviates many sealing problems and prevents the accumulation of trapped air and vapor pockets in cooling chambers thereof. The cooling system essentially comprises communicating cooling chambers formed in the block and head of an engine and means for communicating coolant to an outlet chamber only after the coolant has exceeded a predetermined level in the head's cooling chamber. The hereinafter described embodiments disclose the use of the cooling system in either an "in-line" or a "vee-engine".

BRIEF DESCRIPTION OF THE DRAWING

Further objects of this invention will become apparent from the following description and accompanying drawing wherein:

FIG. 1 is a side elevational view of a four cylinder, in-line engine employing a first cooling system embodiment of this invention therein;

FIG. 2 is an enlarged cross sectional view, taken in the direction of arrows II—II in FIG. 1; and FIG. 3 is a cross sectional view, similar to FIG. 2, but illustrating a modified cooling system employed in a vee-engine.

DETAILED DESCRIPTION

The four cylinder, in-line internal combustion engine illustrated in FIG. 1 comprises an engine block 11 having individual and longitudinally aligned cylinder heads 12 secured thereon. An engine driven pump 13 is adapted to continuously circulate a coolant, such as water, through the engine, a thermostat assembly 14 and radiator 15.

A bypass conduit 16 will periodically communicate coolant from the thermostat assembly to the pump to maintain engine temperature at the desired level in a conventional manner.

Referring to FIG. 2, a single sealing gasket 17 is secured between each cylinder head and the block by suitably arranged heat bolts (not shown). The engine may be of the diesel type comprising a nozzle assembly or fuel injection means 18 mounted centrally in the head for injecting combustible fuel to a combustion chamber defined above a reciprocating piston 19. The piston is mounted in a cylinder 20, formed in the block, and is covered by head 12. In operation, the considerable head generated in the vicinity of the nozzle assembly and piston is efficiently dissipated by the hereinafter described cooling system.

The cooling system comprises an elongated inlet manifold communicating coolant from the pump to four first chamber means 21. The first chamber means are each formed in the block to circumvent a sleeve 22, defining cylinder 20, substantially along the full axial length thereof. The coolant is thereafter communicated to a second chamber means 23, formed in the cylinder head, via vertically disposed passage means 24. The passage means terminates in a tubular member 25 having a deflecting means or horizontally disposed baffle 26 formed at its upper end to deflect the coolant radially inwardly toward nozzle assembly 18.

When the coolant in chamber 23 reaches a predetermined level, exceeding the height of an inlet 27 to a vertically disposed conduit or air purging means 28, the overflowing coolant from each of the four conduits enters an elongated outlet manifold, defining a third chamber means 29 therein. As shown in FIG. 2, the outlet manifold is diametrically opposed to each passage means 24. In most applications, inlet 27 is positioned so that such overflow does not occur until at least fifty percent of the vertical height of the second chamber means 23 is filled with coolant and preferably not until at least eighty percent thereof is filled. In one application of this invention, the inlet was positioned approximately one-half inch from the upper wall or deck of the head.

The coolant is then returned to the radiator for recirculation by pump 12. It should be noted that conduit 28, having its passage continuously exposing the second to the third chamber means, could comprise connecting passages cast integrally in the head and block. For example, passage 28a shown in FIG. 3 typifies such a modification.

Inlet 27 is preferably positioned closely adjacent to the upper wall of the head to force substantially all of the air and vapor, trapped in the second chamber means, through conduit 28. In addition to the air and vapor purging desiderata, it should be noted that only a single gasket 17 is required, i.e., a separate sealing gasket is not required for attaching a separate outlet manifold to head 12, for example. Thus, manufacture and servicing of the engine is facilitated and the system is made highly resistant to leakage.

FIG. 3 illustrates a modification of the cooling system wherein like numerals are employed to identify corresponding constructions, with the numerals depicting the FIG. 3 constructions being accompanied by an a.

The modified cooling system is shown in a vee-type engine having at least two cylinders (one shown) disposed at an acute angle relative to a vertically disposed, imaginary plane. Each head 12a of the engine defines a second chamber means 23a therein which communicates with a first chamber mans 21a via passage means 24a and with an inlet 27a to an air purging means 28a and 28b. The inlet is positioned closely adjacent to a sidewall of the head and vertically above the passage means to communicate overflow coolant to a third chamber means 29a. The air purging means is preferably cast in the head and block to comprise a first passage 28a extending upwardly from the third chamber means to an upper wall of the head and an intersecting second passage 28b extending across and closely adjacent to such upper wall.

In operation of the two embodiments, coolant communicated to first chamber means 21 and 21a is discharged toward nozzles 18 and 18a, respectively. When the coolant reaches a predetermined level, in the respective second chamber means, air and vapor will be expelled into inlets 27 and 27a, preferably positioned closely adjacent to the highest vertical portion of the cylinder head.

What is claimed is:

1. An engine comprising:
   a block having at least one cylinder formed therein and defining a pair of upstanding walls, a head attached to said block to cover said cylinder, said head being substantially rectangular in cross-section with the longer dimension thereof being of the same substantial length as said block and the shorter dimension thereof being aligned and forming an extension of said upstanding walls, first chamber means formed in said block closely adjacent to said cylinder, said first chamber means circumventing said cylinder substantially long the full axial length thereof, and a piston reciprocally mounted in said cylinder and fuel injection means mounted in said head,
   said head further forming a second chamber means, said chamber means being substantially unobstructed whereby the fuel injection means is substantially totally exposed to a coolant passing therethrough,
   first passage means communicating said first and second chamber means,
   third chamber means formed in said block vertically below said second chamber means for receiving coolant from said first chamber means by way of said second chamber means, and
   combined air purging and second passage means directly communicating said second chamber means with said third chamber means and having an inlet positioned upwardly in said second chamber means for delaying direct communication of coolant, in an at least generally vertically downwardly direction, from said second chamber means to said third chamber means until said second chamber means has been at least substantially filled with coolant.

2. The invention of claim 1 wherein said engine is of the vee-type comprising at least two cylinders disposed at an acute angle relative to a vertically disposed plane.

3. The invention of claim 2 wherein said air purging means comprises a first passage extending upwardly from said third chamber means to an upper wall of said head and an intersecting second passage extending across and closely adjacent to said upper wall to terminate at said inlet.

4. The invention of claim 1 wherein said first passage means terminates in a deflecting means in said second chamber means for directing coolant radially inwardly toward said fuel injection means.

5. The invention of claim 1 wherein said first and third chamber means are formed integrally within said block and wherein said first passage means and said third chamber means are diametrically opposed on respective sides of said engine.

6. The invention of claim 1 wherein an inlet to said air purging means is positioned in said second chamber means a distance at least fifty percent of the vertical heighth of said second chamber means.

7. The invention of claim 1 wherein said inlet is positioned vertically above at least eighty percent of the vertical height of said second chamber means.

8. The invention of claim 1 wherein said engine is of the in-line type comprising at least vertically disposed and longitudinally aligned cylinders and wherein the air purging means is vertically disposed to have an inlet thereof terminate closely adjacent to an upper wall of said head.

9. The invention of claim 8 wherein said air purging means comprises a separate conduit extending through wall portions of said head and said block and having a passage formed therethrough continuously exposing said second chamber means to said third chamber means.

10. The invention of claim 1 wherein said air purging means is integrally cast as part of said head and said block.

11. An engine of the vee-type comprising
    a block having at least two cylinders formed therein and being disposed at an acute angle relative to a vertically disposed plane, a head attached to said block to cover said cylinder, first chamber means formed in said block closely adjacent to said cylinder,
    second chamber means formed in said head,
    first passage means communicating said first and second chamber means,
    third chamber means formed in said block vertically below said second chamber means for receiving coolant from said first chamber means by way of said second chamber means,
    combined air purging and second passage means directly communicating said second chamber means with said third chamber means and having an inlet positioned adjacent and vertically above said second passage means leading to said second chamber means for delaying direct communication of coolant, in an at least generally vertically downwardly direction, from said second chamber means to said third chamber means until said second chamber means has been at least substantially filled with coolant and said air purging means being integrally cast as part of said head and said block and comprising a first passage extending upwardly from said third chamber means to an upper wall of said head and an intersecting second passage extending across and closely adjacent to said upper wall to terminate at said inlet.

* * * * *